US007824136B2

(12) United States Patent
Campbell

(10) Patent No.: US 7,824,136 B2
(45) Date of Patent: Nov. 2, 2010

(54) DRILL DRIVER WITH CHUCK-MOUNTED DRILL ACCESSORIES

(75) Inventor: David C. Campbell, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 122 days.

(21) Appl. No.: 12/181,118

(22) Filed: Jul. 28, 2008

(65) Prior Publication Data

US 2008/0279648 A1 Nov. 13, 2008

Related U.S. Application Data

(62) Division of application No. 11/357,928, filed on Feb. 17, 2006, now Pat. No. 7,404,696.

(60) Provisional application No. 60/654,847, filed on Feb. 18, 2005.

(51) Int. Cl.
*B23B 47/28* (2006.01)
*B23B 45/14* (2006.01)

(52) U.S. Cl. .................... 408/1 R; 408/72 R; 408/112; 408/241 G; 279/62; 279/157

(58) Field of Classification Search ............... 408/72 R, 408/95, 99, 100, 110, 112, 115 R, 241 G, 408/1 R; 279/157, 60–62; *B23B 45/14, B23B 47/28*
See application file for complete search history.

(56) References Cited

U.S. PATENT DOCUMENTS 125,642 A * 4/1872 Whitus ....................... 408/202
521,997 A * 6/1894 Whitus et al. ............... 408/202
2,198,288 A * 4/1940 Leaman ...................... 408/112
2,210,128 A * 8/1940 Rohr .......................... 408/81
2,525,588 A * 10/1950 Cameron et al. ............ 362/119
2,561,914 A * 7/1951 Douglass .................... 408/114
3,583,821 A * 6/1971 Shaub et al. .............. 408/72 R
3,741,671 A * 6/1973 Douglass .................... 408/114
4,078,869 A * 3/1978 Honeycutt ................... 408/16
4,179,231 A * 12/1979 Hadden ...................... 408/112
4,227,839 A * 10/1980 Conway ...................... 408/16
4,235,565 A * 11/1980 Albano ........................ 408/99
4,275,893 A 6/1981 Bilanceri
4,305,597 A 12/1981 McCarty
4,848,779 A 7/1989 Wheeler et al.
4,848,980 A * 7/1989 Broussard .................... 408/67
4,955,984 A * 9/1990 Cuevas ........................ 408/67
5,061,123 A * 10/1991 Broussard .................... 408/67

(Continued)

FOREIGN PATENT DOCUMENTS

DE 3518755 A1 * 11/1986

(Continued)

*Primary Examiner*—Eric A Gates
(74) *Attorney, Agent, or Firm*—Harness, Dickey & Pierce, P.L.C.

(57) ABSTRACT

A power tool with a tool portion and at least one attachment. The tool portion has a tool body and a drill chuck. The drill chuck includes a rotatable spindle, a plurality of jaws that are coupled to the rotatable spindle and a cover that is disposed about the jaws and which is not coupled for rotation with the rotatable spindle. The attachment is coupled the cover of the drill chuck.

19 Claims, 4 Drawing Sheets

U.S. PATENT DOCUMENTS

| | | | | | |
|---|---|---|---|---|---|
| 5,062,747 | A * | 11/1991 | Chen | 408/115 R |
| 5,160,230 | A * | 11/1992 | Cuevas | 408/67 |
| 5,195,760 | A | 3/1993 | Wheeler et al. | |
| 5,445,479 | A * | 8/1995 | Hillinger | 408/16 |
| 5,653,561 | A * | 8/1997 | May | 408/67 |
| 5,797,670 | A * | 8/1998 | Snoke et al. | 362/119 |
| 5,829,931 | A * | 11/1998 | Doumani | 409/182 |
| 5,988,653 | A | 11/1999 | Kuo | |
| 5,992,859 | A | 11/1999 | Lin | |
| 6,164,881 | A * | 12/2000 | Shono | 409/137 |
| 6,241,260 | B1 | 6/2001 | Judge et al. | |
| 6,247,706 | B1 | 6/2001 | Kuo | |
| 6,247,879 | B1 * | 6/2001 | Costa | 408/112 |
| 6,257,596 | B1 | 7/2001 | Yang | |
| 6,261,035 | B1 | 7/2001 | Moores, Jr. et al. | |
| 6,447,221 | B1 * | 9/2002 | Chen | 408/113 |
| 6,474,656 | B1 | 11/2002 | Thomas | |
| 6,488,286 | B2 | 12/2002 | Yaksich | |
| 6,494,590 | B1 * | 12/2002 | Paganini et al. | 362/119 |
| 6,517,295 | B2 | 2/2003 | Lin | |
| 6,517,297 | B2 | 2/2003 | Cochran et al. | |
| 6,688,611 | B2 | 2/2004 | Gifford et al. | |
| 6,729,812 | B2 | 5/2004 | Yaksich et al. | |
| 6,902,358 | B2 | 6/2005 | Thomas | |
| 7,175,371 | B2 * | 2/2007 | Vidal | 408/1 R |
| 2002/0131834 | A1 * | 9/2002 | Lui et al. | 408/124 |
| 2003/0101568 | A1 * | 6/2003 | Donovan et al. | 29/566.1 |
| 2007/0264091 | A1 * | 11/2007 | Bleicher et al. | 408/58 |
| 2009/0136309 | A1 * | 5/2009 | Coulston et al. | 408/200 |

FOREIGN PATENT DOCUMENTS

JP 2003103409 A * 4/2003

* cited by examiner

DRILL DRIVER WITH CHUCK-MOUNTED DRILL ACCESSORIES

CROSS REFERENCE TO RELATED APPLICATIONS

This application is a divisional of U.S. patent application Ser. No. 11/357,928 filed Feb. 17, 2006 now U.S. Pat. No. 7,404,696, which claims the benefit of U.S. Provisional Patent Application No. 60/654,847 filed Feb. 18, 2005. The disclosures of the aforementioned applications are hereby incorporated by reference as if fully set forth in detail herein.

INTRODUCTION

The present disclosure generally relates to drill/drivers and more particularly to a drill/driver with one or more accessories that may be mounted to a non-rotating cover that extends about the jaws of a drill chuck.

SUMMARY

In one form, the present teachings provide a power tool with a tool portion and at least one accessory. The tool portion has a tool body and a drill chuck. The drill chuck includes a rotatable spindle, a plurality of jaws that are coupled to the rotatable spindle and a cover that is disposed about the jaws. The cover is not coupled for rotation with the rotatable spindle and is separate from the tool body. The at least one accessory is mounted directly to the cover of the drill chuck and includes an alignment guide that is resiliently deflectable relative to a rotational axis of the rotatable spindle. An end of the alignment guide opposite the drill chuck is configured to abut a workpiece and deflection of the alignment guide can be employed to gauge whether the rotational axis of the rotatable spindle is generally perpendicular to the end of the alignment guide.

In another form, the present teachings provide a method for forming a hole. The method includes: providing a tool portion having a tool body and a drill chuck, the drill chuck including a rotatable spindle, a plurality of jaws coupled to the rotatable spindle and a cover that is disposed about the jaws, the cover not being coupled for rotation with the rotatable spindle and being separate from the tool body; mounting a rotary hole forming tool bit in between the jaws; mounting an alignment guide directly to the cover of the drill chuck; positioning a cutting end of the rotary hole forming tool against a face of a workpiece; positioning an end of the alignment guide against the face of the workpiece; comparing at least two sides of the alignment guide to one another to determine whether the at least two sides have deflected in a generally symmetric manner; and rotating the rotary hole forming tool to form the hole if the sides have deflected in a generally symmetric manner.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Additional advantages and features of the present disclosure will become apparent from the subsequent description and the appended claims, taken in conjunction with the accompanying drawings, wherein:

DETAILED DESCRIPTION OF THE VARIOUS EMBODIMENTS

Figures 1, 1A:
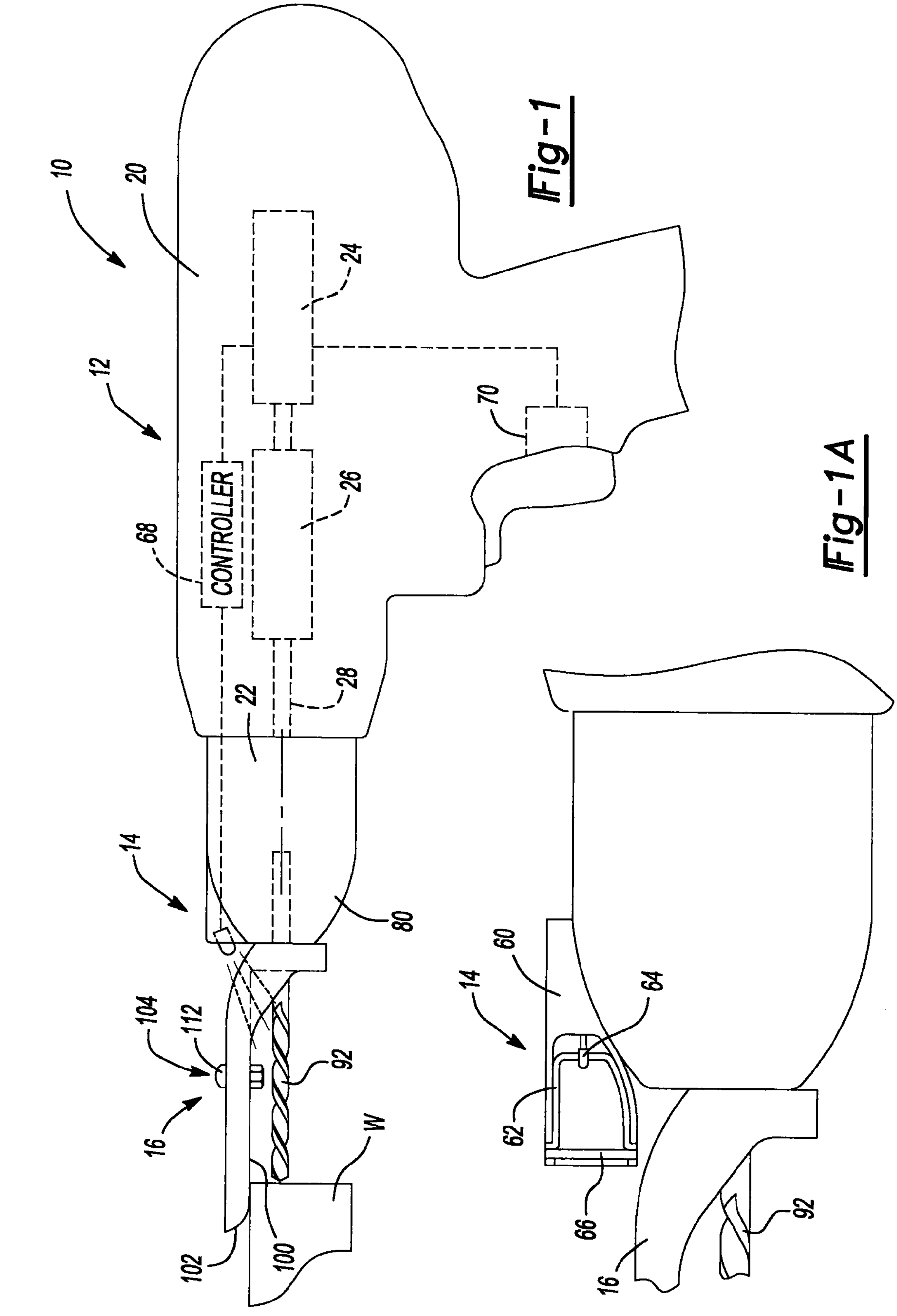
FIG. 1 is a side elevation view of a drill/driver constructed in accordance with the teachings of the present disclosure.
FIG. 1A is an enlarged portion of the drill/driver of FIG. 1.

With reference to FIG. 1 of the drawings, a drill/driver assembly constructed in accordance with the teachings of the present disclosure is generally indicated by reference numeral 10. The drill/driver assembly 10 can include a tool portion 12 and one or more accessories, such as a light 14 and a positioning guide, such as an edge guide 16, that can be fixedly coupled or fixedly but releasably coupled to the tool portion 12.

In the particular example provided, the tool portion 12 includes a tool body 20 and a drill chuck 22. The tool body 20 can be constructed in any desired manner, such as that which is disclosed in U.S. Pat. No. 6,431,289, which is hereby incorporated by reference as if fully set forth herein. Briefly, the tool body 20 can generally include a motor 24 and transmission 26 that cooperate to provide rotary power to an output spindle 28 to which the drill chuck 22 is coupled for rotation.

Figure 2:
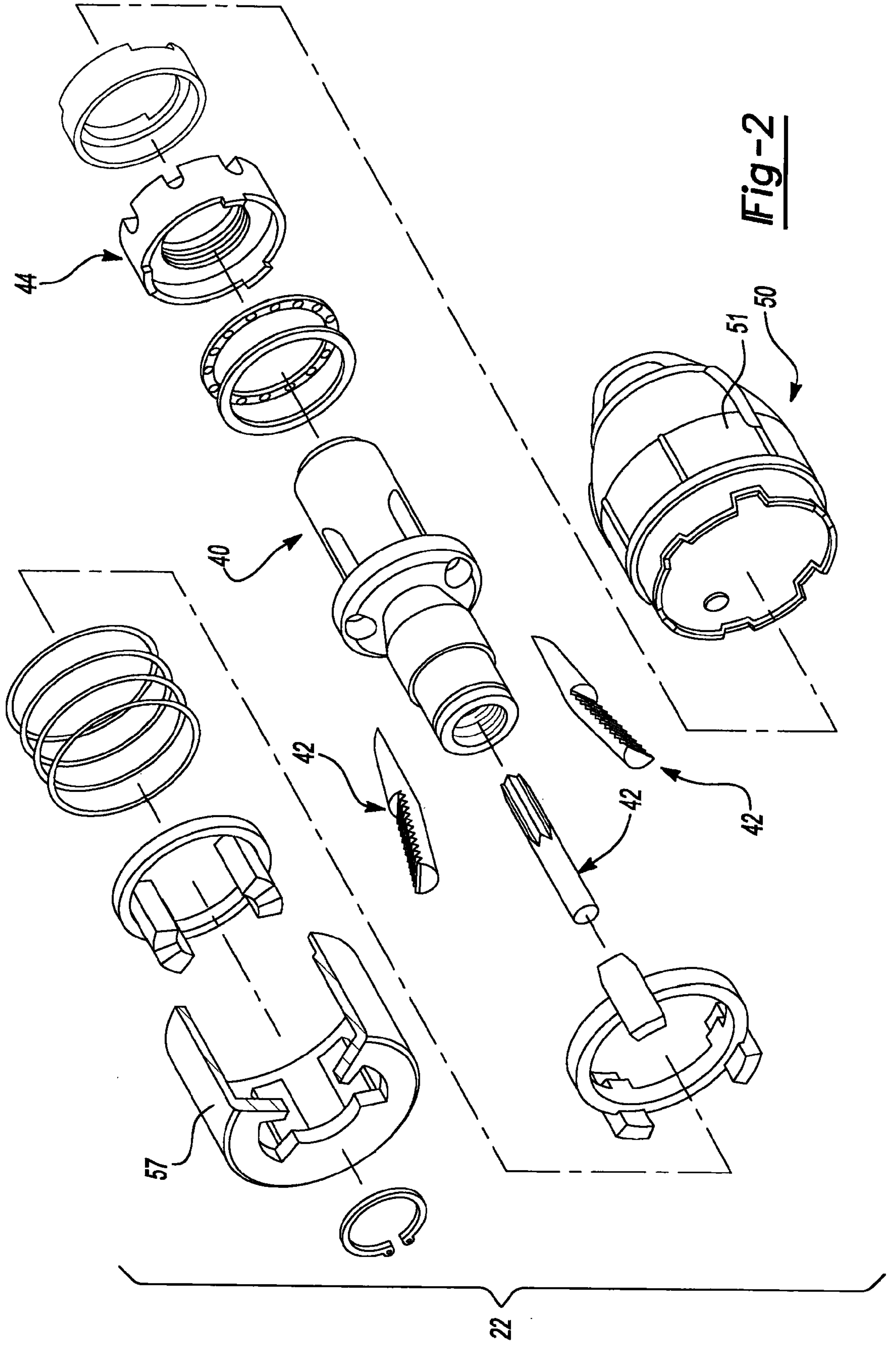
FIG. 2 is an exploded perspective view of a portion of the drill/driver of FIG. 1 illustrating the drill chuck in greater detail.

The drill chuck 22 can be a keyless impacting drill chuck of the type that is disclosed in U.S. Pat. Nos. 6,247,706; 6,257,596; and 6,488,286, the disclosures of which are hereby incorporated by reference as if fully set forth herein. With additional reference to FIG. 2, the drill chuck 22 includes a chuck spindle 40 that is rotatably coupled to the output spindle 28. A plurality of jaws 42 are mounted to the chuck spindle 40 and a nut 44 threadably engages the jaws 42 so that they may be selectively moved radially inward or outward relative to the axis of the chuck spindle 40. The spindle 40 is received in a cover shell 50 that includes a top cover shell 51 and a bottom cover shell 57, which is non-rotatably coupled to the tool body 20. In the particular example provided, the top cover shell 51 does not rotate with the chuck spindle 40 but is rotatably relative to the bottom cover shell 57 to initiate an impacting action that effects further tightening of the jaws 42 to a drill or bit that is chucked in the drill chuck 22 as is described in U.S. Pat. No. 6,247,706.

Returning to FIG. 1 and with additional reference to FIG. 1A, the light 14 can include a housing 60 that can be fixedly coupled to the cover shell 50, a reflector 62, one or more lamps 64, and a lens cover 66. The reflector 62 can include a reflective surface that can be contoured so as to collect the light that is transmitted in a rearward direction from the lamps 64 and reflect that light forwardly toward the lens cover 66. The lamps 64 can comprise one or more incandescent lamps and/or LED's and can be electrically coupled to a controller 68 that selectively provides electrical power to operate the lamps 64. In one basic configuration, the controller 68 can comprise a trigger-activated switch 70 that is also employed to control the operation of the tool body 20. As those of ordinary skill in the art will appreciate from this disclosure, the controller 68 can alternatively be configured to receive an input signal (e.g., from the trigger-activated switch 70) and operate the lamps 64 in response thereto according to a predetermined control scheme. For example, upon actuation of the trigger-activated switch 70, the controller 68 could be configured to illuminate the lamps 64 for a predetermined amount of time. The controller 68 could also be employed to transmit optical data via the lamps 64. The lens cover 66 can focus the light that is generated by the lamps 64 in a desired manner and can guard against the infiltration of dirt, debris and/or water into the interior of the light 14.

Figure 3:
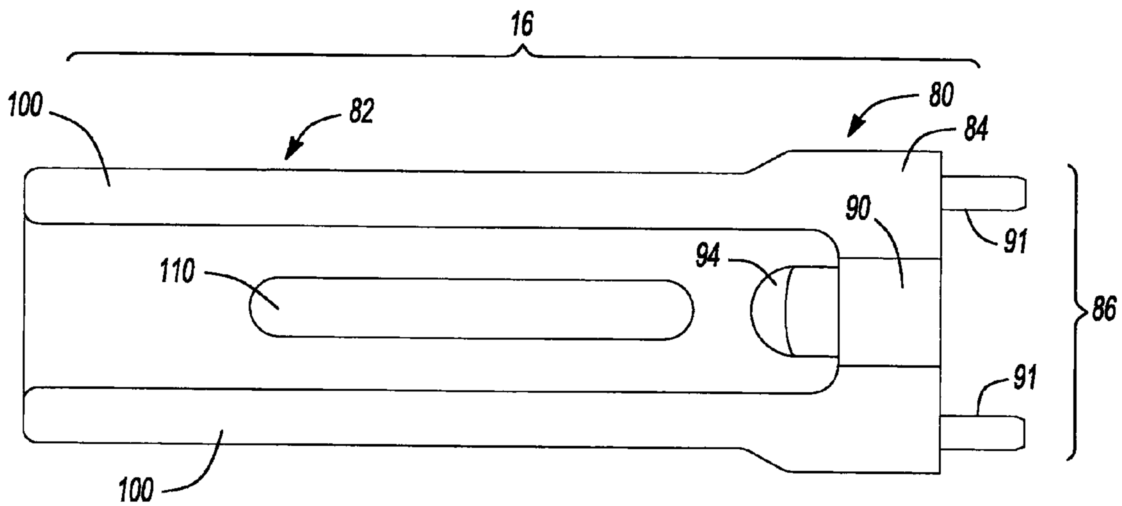
FIG. 3 is a bottom view of a portion of the drill/driver of FIG. 1, illustrating the edge guide in greater detail.

With reference to FIGS. 1 and 3, the edge guide 16 can include a base portion 80 and a guide portion 82 that are arranged in a generally L-shaped manner. The base portion 80 can include a base structure 84 and an attachment 86. The base structure 84 is adapted to be mounted flush against the front face 22*a* of the drill chuck 22. In the particular example provided, the base structure 84 includes a drill aperture 90 that is sized to receive a drill bit 92 therethrough, and a lighting aperture 94 that is sized to permit the light that is generated by the light 14 to travel therethrough and illuminate the drill bit 92. The attachment 86 is coupled to the base structure 84 and permits the base structure 84 to be removably coupled to the cover shell 50. The attachment 86 may comprise a pair of pins 91 that may frictionally engage the walls of corresponding apertures formed into the front face of the cover shell 50. An alternate attachment means, such as screws or magnets, may be employed in conjunction with or in lieu of the pins 90.

The guide portion 82 may be unitarily formed with the base portion 80 and can include one or more guide rails 100 that are offset from the rotational axis of the drill bit 92. In the example provided, the guide rails 100 terminate at their distal end in a gently sloping radius 102. The guide portion 82 may include a stop device 104 that can be employed to contact a workpiece W to limit the depth of a hole that is to be drilled. In the example provided, the stop device 104 includes a slotted aperture 110, a screw 112 and a nut 114. The screw 112 is disposed in the slotted aperture 110 and threadably engaged to the nut 114. Clamping force produced by the screw 112 and nut 114 maintains the screw 112 and nut 114 at a desired location, while contact between the nut 114 and the workpiece W signals the operator that the hole has been drilled to a desired depth.

Figure 4:
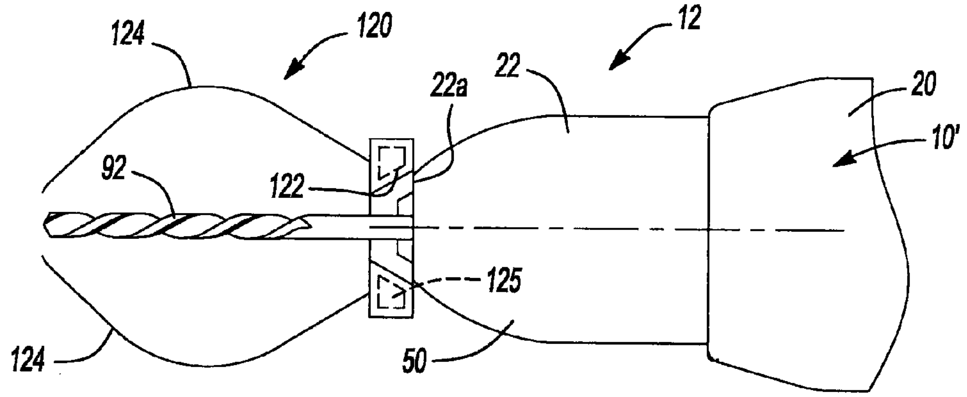
FIG. 4 is a top plan view of a portion of a second drill/driver constructed in accordance with the teachings of the present disclosure.
Figure 5:
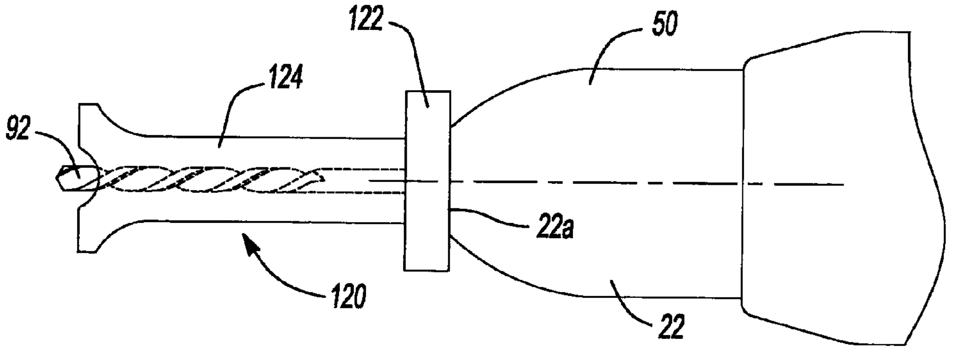
FIG. 5 is a side view of a portion of the drill/driver of FIG. 4.

With reference to FIGS. 4 and 5, a second drill/driver constructed in accordance with the teachings of the present disclosure is generally indicated by reference number 10'. The drill/driver 10' includes a tool portion 12, with a tool body 20 and a drill chuck 22, and an alignment guide, such as a square guide 120. The tool body 20 and drill chuck 22 are substantially identical to that which is described above in conjunction with the embodiment of FIG. 1 and as such, further discussion of these components is not necessary. The square guide 120 includes a base portion 122, which can be removably attached to the cover shell 50, and a pair of spring fingers 124 that are fixedly coupled to the base portion 122. The base portion 122 may be constructed in a manner that is similar to that of the edge guide 16 as described above. In the particular example provided, however, the base portion 122 is an annular structure that is formed of a plastic material into which a magnet 125 is encased. The plastic material that forms the base portion 122 has a shape that matingly engages the front of the drill chuck 22, while the magnet 125 draws and holds the base portion 122 into engagement with the front face 22*a* of the drill chuck 22.

The spring fingers 124 extend from the base portion 122 and are oriented generally parallel to the rotational axis of the drill bit 92. The spring fingers 124 may be formed of metal, such as spring steel, a plastic or a polymer and preferably have a length that approximately corresponds to a distance by which the drill bit 92 extends from the drill chuck 22. Prior to drilling, the drill bit 92 is oriented such that both of the spring fingers 124 contact the surface of the workpiece W. If the spring fingers 124 are somewhat longer than the distance by which the drill bit 92 extends from the drill chuck 22, or if one desires to check the perpendicularity of a hole that is being drilled, the spring fingers 124 will deflect as shown in FIG. 5. As the operator will be able to visually compare the amount and direction by which each of the spring fingers 124 have deflected, the operator will be able to note instances where the drill bit 92 is not perpendicular relative to the workpiece W and adjust the orientation of the workpiece W accordingly.

Figure 6:
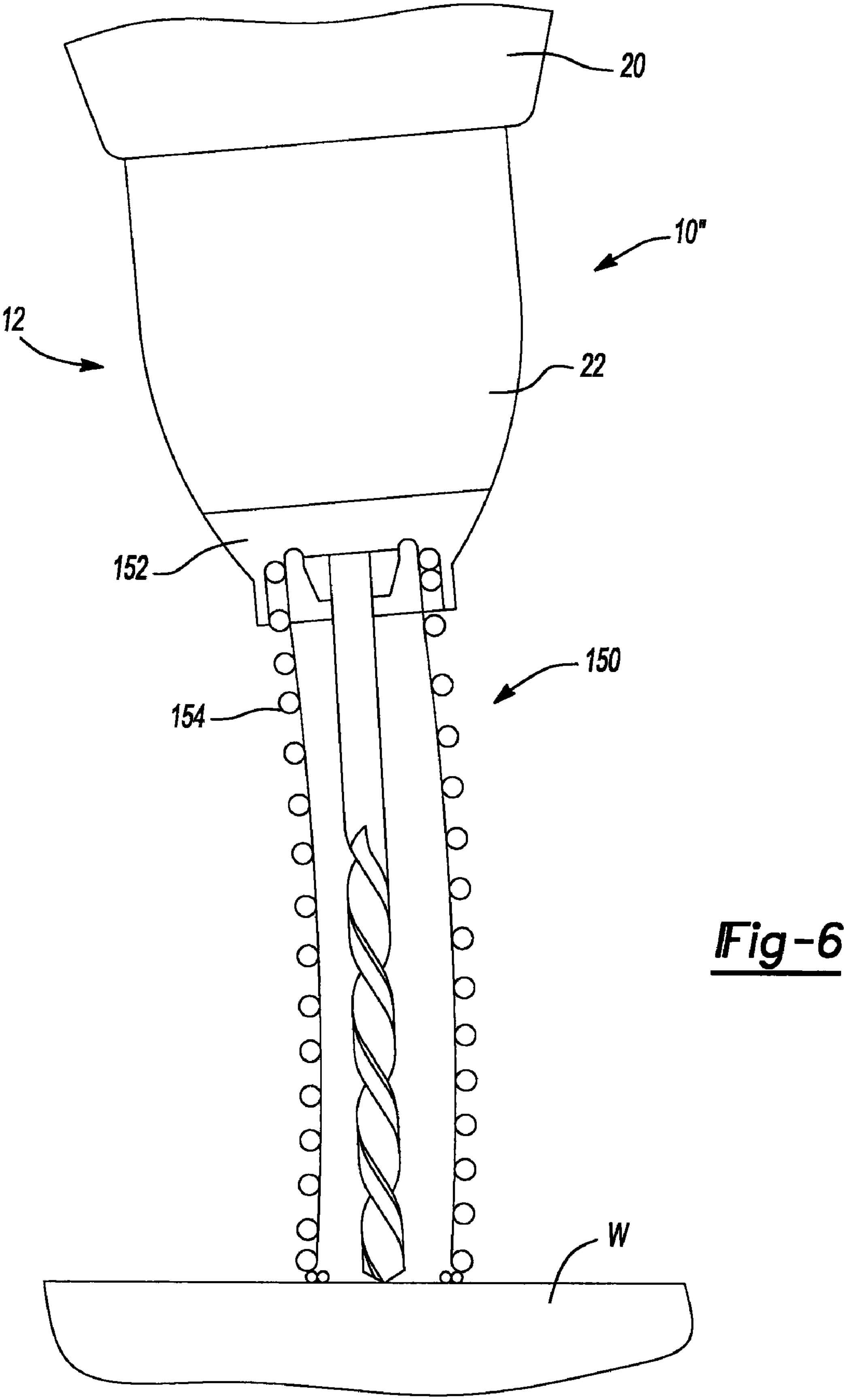
FIG. 6 is a schematic view in partial section of a third drill/driver constructed in accordance with the teachings of the present disclosure.

With reference to FIG. 6, a third drill/driver constructed in accordance with the teachings of the present disclosure is generally indicated by reference number 10". The drill/driver 10" includes a tool portion 12, with a tool body 20 and a drill chuck 22, and a square guide 150. The tool body 20 and drill chuck 22 are substantially identical to that which is described above in conjunction with the embodiment of FIG. 1 and as such, further discussion of these components is not necessary. The square guide 150 includes a base portion 152, which can be removably attached to the cover shell 50, and a spring coil collar 154 that is fixedly coupled to the base portion 152. The base portion 152 is constructed in a manner that is similar to that of the edge guide 16 as described above.

The spring coil collar 154 extends from the base portion 152 and is oriented generally parallel to the rotational axis of the drill bit 92. The spring coil collar 154 can be formed of a relatively light diameter wire that permits the user to visually track the position of the distal end of the drill bit 92 relative to the distal end of the spring coil collar 154 and the coaxiality of the drill bit relative to the coil collar. In situations where the drill bit 92 is not perpendicular to a workpiece W, spring coil collar 154 will buckle and the spacing between the drill bit 92 and the sides of the spring coil collar 154 (at an intermediate point along the length of the spring coil collar 154) will not be even (i.e., a "hump" will be visible to one side where the spring coil collar 154 buckles) as is shown in FIG. 6.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A power tool comprising: a tool portion having a tool body and a drill chuck, the drill chuck including a rotatable spindle, a plurality of jaws coupled to the rotatable spindle, and a cover that is disposed about the jaws, the cover not being coupled for rotation with the rotatable spindle and being separate from the tool body, the cover entirely shrouding the rotatable spindle and the plurality of jaws about their circumference over at least a portion of their length; and at least one accessory removably mounted directly to the cover of the drill chuck, the at least one accessory including an alignment guide that is resiliently deflectable relative to a rotational axis of the rotatable spindle, wherein an end of the alignment guide opposite the drill chuck is configured to abut a workpiece and deflection of the alignment guide relative to the cover and the tool body can be employed to gauge whether the rotational axis of the rotatable spindle is generally perpendicular to the end of the alignment guide.

2. The power tool of claim 1, wherein the alignment guide includes a plurality of resilient fingers.

3. The power tool of claim 2, wherein the alignment guide comprises two resilient fingers that are disposed on opposite sides of the rotational axis.

4. The power tool of claim 1, wherein the alignment guide includes a helical coil spring that is disposed concentrically about the rotational axis.

5. The power tool of claim 1, wherein the cover includes at least one aperture into which a portion of the alignment guide is received.

6. The power tool of claim 5, wherein the at least one aperture is centered about the rotational axis.

7. The power tool of claim 1, wherein the alignment guide and the cover includes a magnet, the magnet being configured to releasably couple the alignment guide and the cover to one another.

8. The power tool of claim 7, wherein the alignment guide includes a base that directly abuts the cover and wherein the magnet is disposed in the base.

9. A method for forming a hole, the method comprising:

providing a tool portion having a tool body and a drill chuck, the drill chuck including a rotatable spindle, a plurality of jaws coupled to the rotatable spindle and a cover that is disposed about the jaws, the cover not being coupled for rotation with the rotatable spindle and being separate from the tool body, the cover entirely shrouding the rotatable spindle and the plurality of jaws about their circumference over at least a portion of their length;

mounting a rotary hole forming tool bit in between the jaws;

mounting an alignment guide directly to the cover of the drill chuck;

positioning a cutting end of the rotary hole forming tool against a face of a workpiece;

positioning an end of the alignment guide against the face of the workpiece;

comparing at least two sides of the alignment guide to one another to determine whether the at least two sides have deflected in a generally symmetric manner; and rotating the rotary hole forming tool to form the hole if the sides have deflected in a generally symmetric manner.

10. The method of claim 9, wherein if the sides have not deflected in a generally symmetric manner, the method further comprises re-orienting the tool bit such that the sides have deflected in a generally symmetric manner.

11. The method of claim 10, wherein the alignment guide includes a helical coil spring and wherein comparing the at least two sides of the alignment guide includes comparing a spacing between pairs of the coils of the helical coil spring on the at least two sides.

12. The method of claim 9, wherein mounting the alignment guide to the cover includes magnetically coupling the alignment guide to the cover.

13. The method of claim 12, wherein a magnet is carried by the alignment guide.

14. The method of claim 9, wherein mounting the alignment guide to the cover includes inserting a portion of one of the alignment guide and the cover into the other one of the alignment guide and the cover.

15. The method of claim 14, wherein the alignment guide is received into an aperture that is formed in the cover concentric with the rotatable spindle.

16. The method of claim 9, wherein the rotary hole forming tool bit is a drill.

17. The method of claim 16, wherein the drill is a twist drill.

18. A method for forming a hole, the method comprising:

providing a tool portion having a tool body and a drill chuck, the drill chuck including a rotatable spindle, a plurality of jaws coupled to the rotatable spindle and a cover that is disposed about the jaws, the cover not being coupled for rotation with the rotatable spindle and being separate from the tool body;

mounting a rotary hole forming tool bit in between the jaws;

mounting an alignment guide directly to the cover of the drill chuck;

positioning a cutting end of the rotary hole forming tool against a face of a workpiece;

positioning an end of the alignment guide against the face of the workpiece;

comparing at least two sides of the alignment guide to one another to determine whether the at least two sides have deflected in a generally symmetric manner; and rotating the rotary hole forming tool to form the hole if the sides have deflected in a generally symmetric manner;

wherein if the sides have not deflected in a generally symmetric manner, the method further comprises re-orienting the tool bit such that the sides have deflected in a generally symmetric manner; and wherein the alignment guide includes a helical coil spring and wherein comparing the at least two sides of the alignment guide includes comparing a spacing between pairs of the coils of the helical coil spring on the at least two sides.

19. A method for forming a hole, the method comprising:

providing a tool portion having a tool body and a drill chuck, the drill chuck including a rotatable spindle, a plurality of jaws coupled to the rotatable spindle and a cover that is disposed about the jaws, the cover not being coupled for rotation with the rotatable spindle and being separate from the tool body;

mounting a rotary hole forming tool bit in between the jaws;

mounting an alignment guide directly to the cover of the drill chuck;

positioning a cutting end of the rotary hole forming tool against a face of a workpiece;

positioning an end of the alignment guide against the face of the workpiece;

comparing at least two sides of the alignment guide to one another to determine whether the at least two sides have deflected in a generally symmetric manner; and rotating the rotary hole forming tool to form the hole if the sides have deflected in a generally symmetric manner;

wherein mounting the alignment guide to the cover includes inserting a portion of one of the alignment guide and the cover into the other one of the alignment guide and the cover; and wherein the alignment guide is received into an aperture that is formed in the cover concentric with the rotatable spindle.

* * * * *